United States Patent
Buti et al.

(10) Patent No.: US 7,243,170 B2
(45) Date of Patent: Jul. 10, 2007

(54) METHOD AND CIRCUIT FOR READING AND WRITING AN INSTRUCTION BUFFER

(75) Inventors: Taqi N. Buti, Millbrook, NY (US); Brian W. Curran, Saugerties, NY (US); Maureen A. Delaney, Richmond, VT (US); Saiful Islam, Austin, TX (US); Zakaria M. Khwaja, Austin, TX (US); Jafar Nahidi, Austin, TX (US); Dung Q. Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 521 days.

(21) Appl. No.: 10/707,149

(22) Filed: Nov. 24, 2003

(65) Prior Publication Data

US 2005/0114603 A1     May 26, 2005

(51) Int. Cl.
*G06F 3/00*     (2006.01)
*G06F 5/00*     (2006.01)

(52) U.S. Cl. .......................... 710/52; 711/129; 711/200

(58) Field of Classification Search ................. 710/1, 710/22; 711/118, 123
See application file for complete search history.

(56) References Cited

U.S. PATENT DOCUMENTS

| | | | |
|---|---|---|---|
| 5,113,370 A | 5/1992 | Tomita | |
| 5,598,544 A | 1/1997 | Ohshima | |
| 5,819,056 A | 10/1998 | Favor | |
| 6,233,197 B1 * | 5/2001 | Agrawal et al. | 365/230.05 |
| 6,243,287 B1 * | 6/2001 | Naffziger et al. | 365/154 |
| 6,250,821 B1 | 6/2001 | Schwendinger | |

\* cited by examiner

*Primary Examiner*—Kim Huynh
*Assistant Examiner*—Aurangzeb Hassan
(74) *Attorney, Agent, or Firm*—Schmeiser, Olsen & Watts; Anthony J. Canale (57) ABSTRACT

An instruction buffer and a method of buffering instructions. The instruction buffer including: a memory array partitioned into multiple identical memory sub-arrays arranged in sequential order from a first memory sub-array to a last memory sub-array, each memory sub-array having multiple instruction entry positions and adapted to store a different instruction of a set of concurrent instructions in a single instruction entry position of any one of the memory sub-arrays, the set of concurrent instructions arranged in sequential order from a first instruction to a last instruction

24 Claims, 8 Drawing Sheets

METHOD AND CIRCUIT FOR READING AND WRITING AN INSTRUCTION BUFFER

BACKGROUND OF INVENTION

1. Field of the Invention

The present invention relates to the field of processors; more specifically, the present invention relates to an instruction buffer circuit for buffering multiple instructions for a processor simultaneously and a method of buffering multiple instructions for a processor simultaneously.

2. Background of the Invention

In a high performance processor application in order to maximize the number of instructions executed concurrently and to provide high bandwidth to the instruction cache, a large register file instruction buffer (IBUF) supporting multiple writes and reads is required. In our application, a 64-entry instruction buffer supporting 8 concurrent writes and 5 concurrent reads is required to allow for high concurrency in the pipeline. The conventional approach is to implement the register file instruction buffer with 8 write ports and 5 read ports. This approach requires a large SRAM cell area to support the required numerous read and write ports. It also requires a complex decoding scheme resulting in a slow access and large array area. The multi-ported array therefore represents a potential integration and timing problem. Therefore, an instruction buffer capable of supporting multiple writes and multiple reads concurrently and requiring a minimum amount of memory area and fast access is needed.

SUMMARY OF INVENTION

A first aspect of the present invention is an instruction buffer comprising: a memory array partitioned into multiple identical memory sub-arrays arranged in sequential order from a first memory sub-array to a last memory sub-array, each memory sub-array having multiple instruction entry positions and adapted to store a different instruction of a set of concurrent instructions in a single instruction entry position of any one of the memory sub-arrays, the set of concurrent instructions arranged in sequential order from a first instruction to a last instruction.

A second aspect of the present invention is a method of buffering instructions for a processor, comprising: providing a memory array partitioned into multiple identical memory sub-arrays arranged in sequential order from a first memory sub-array to a last memory sub-array, each memory sub-array having multiple instruction entry positions and adapted to store a different instruction of a set of concurrent instructions in a single instruction entry position of any one of the memory sub-arrays, the set of concurrent instructions arranged in sequential order from a first instruction to a last instruction; and writing and reading instructions of the set of concurrent instructions to and from the memory array.

BRIEF DESCRIPTION OF DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION

The present invention uses a memory arrays comprised of single write port, single read port memory cells to make multiple concurrent writes to and reads from an instruction buffer. The present invention supports any number of concurrent writes and reads while still utilizing single read/write port memory cells. Examples of the type of memory arrays that may be used by the present invention include, but are not limited to, static random access memory (SRAM), dynamic random access memory (DRAM), a latch array, or a register file. Since some details of the circuit implementation of the present invention depend on the number of write and read ports to the memory cells in the memory array portion of the invention, it is useful to review a single write port, single read port memory array and a multiple write port, multiple read port memory array. It will also make clearer some of the terminology used in describing the present invention.

Figure 1:
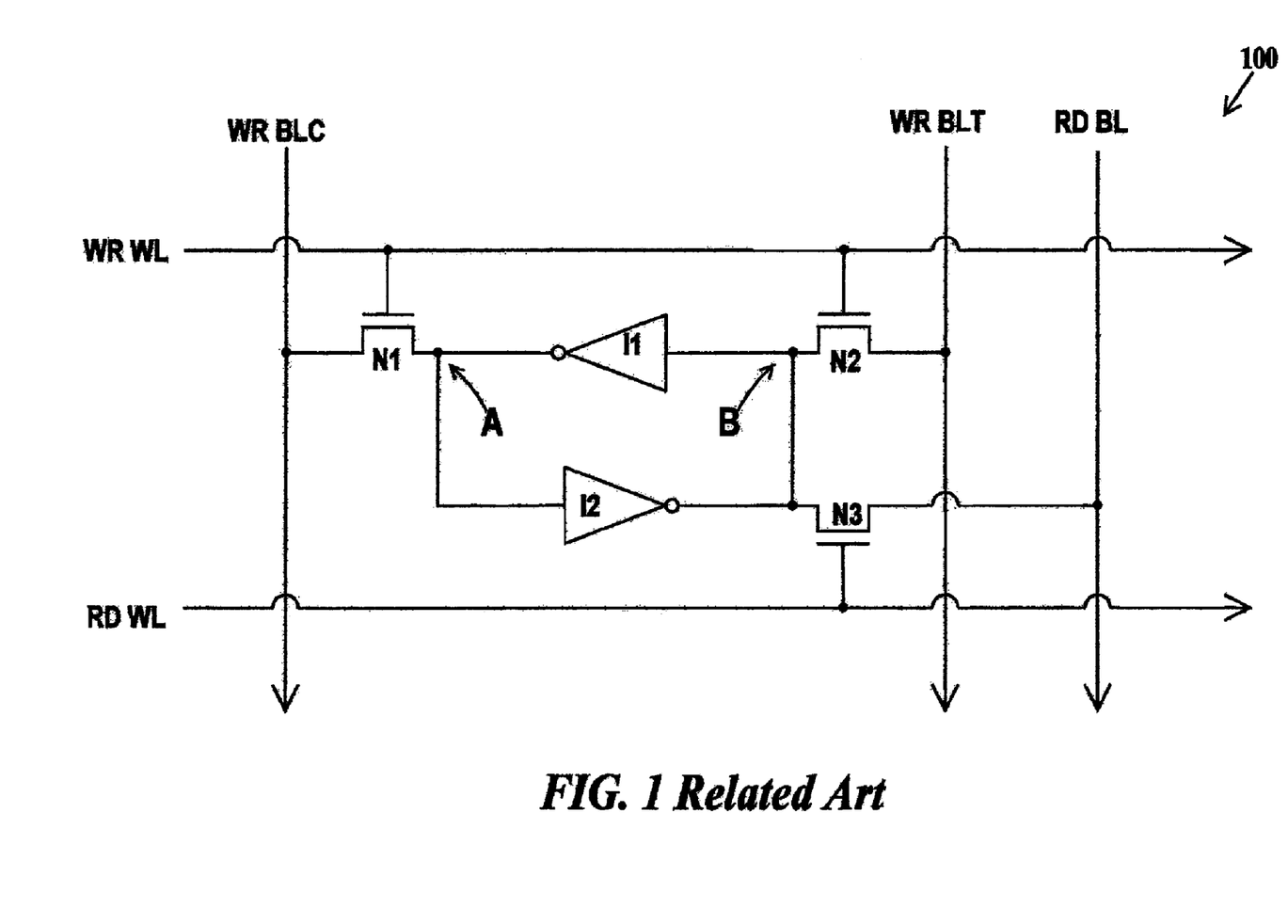
FIG. 1 is a schematic diagram of a portion of an exemplary single read port, single write port memory array.

FIG. 1 is a schematic diagram of a portion of an exemplary single read port, single write port memory array. In FIG. 1, a portion of an SRAM array 100 (an SRAM is used as an example) includes a storage latch comprised of inverters I1 and I2, two write pass gates NFETs N1 and N2 and a read pass gate NFET N3. The gate of NFETs N1 and N2 are coupled to a write wordline (WR WL) and the gate of NFET N3 is coupled to a read wordline (RD WL). The source/drains of NFET N1 are coupled between a write bitline complement (WR BLC) and a storage node A. The source/drains of NFET N2 are coupled between a write bitline true (WR BLT) and a storage node B. The source/drains of NFET N3 are coupled between a read bitline (RD BL) and storage node B. The output of inverter I1 is coupled to node A and the input of inverter I2. The output of inverter I2 is coupled to node B and the input of inverter I1.

In a write operation, data on WR BLC and WR BLT is written to storage nodes A and B by turning on WR WL. In a read operation, data on storage node B is read out to RD BL by turning on RD WL. While a single ended read is illustrated, a doubled ended read may be used by the present invention as well.

Figure 2:
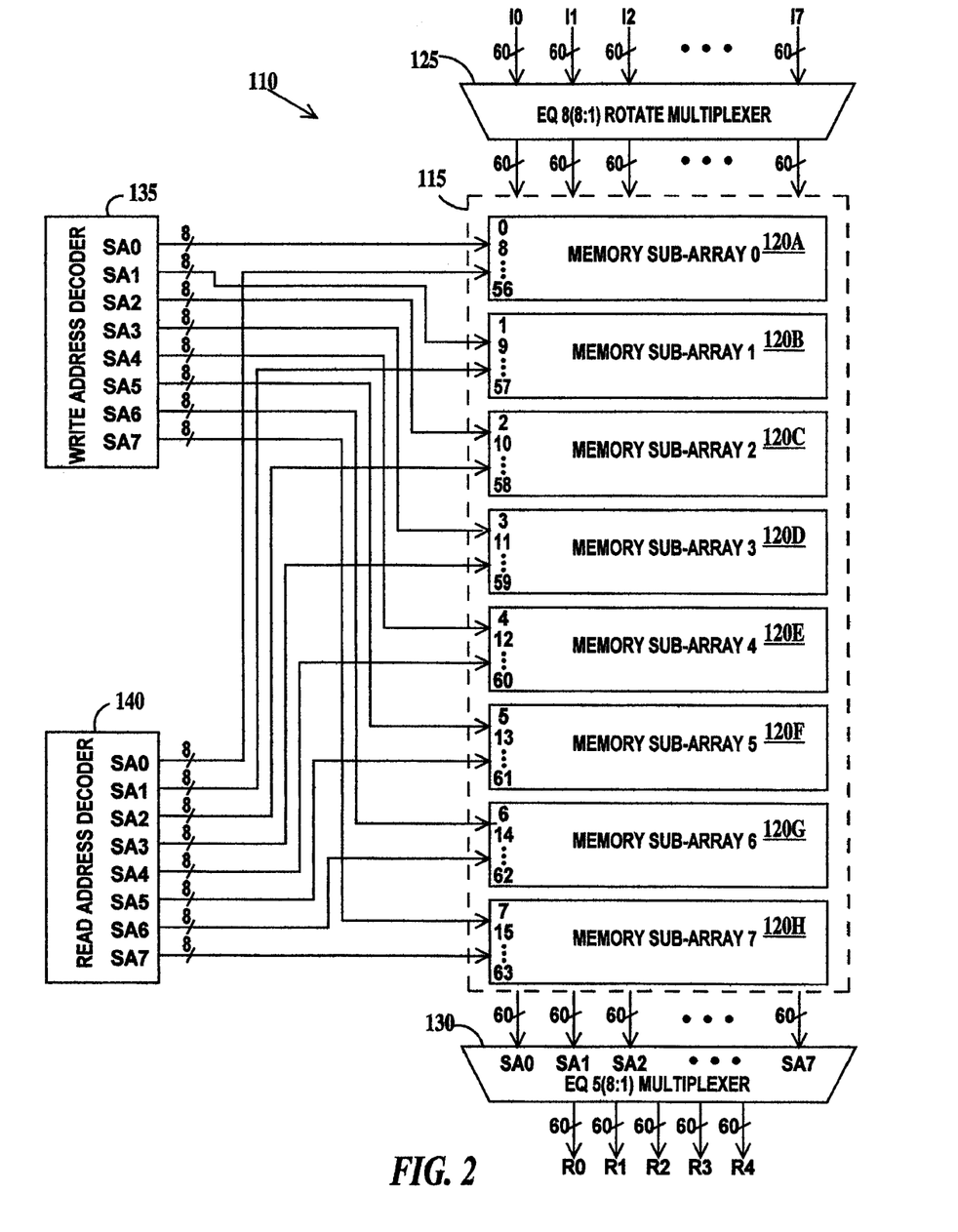
FIG. 2 is a block schematic diagram of an exemplary instruction buffer utilizing single write port, single read port storage according to the present invention.

FIG. 2 is a block schematic diagram of an exemplary instruction buffer 110 utilizing single write port, single read port storage according to the present invention. In FIG. 2, instruction buffer 110 includes a memory array 115 comprised of eight memory sub-arrays 120A, 120B, 120C, 120D, 120E, 120F, 120G and 120H, an input rotator multiplexer 125, an output multiplexer 130, a write address decoder 135 and a read address decoder 140. Memory sub-arrays 120A, 120B, 120C, 120D, 120E, 120F, 120G and 120H are also designated SA0, SA1, SA2, SA3, SA4, SA5, SA6 and SA7 respectively. This later designation will be used when emphasis of the physical or logical relationship of a memory sub-array to another component of instruction buffer 110 or to an instruction would aid in understanding the present invention.

Instruction buffer 110 is a 64 instruction-entry position, write eight instructions and read five instructions instruction buffer. 64 instructions is the maximum number of instructions that instruction buffer 110 is designed to hold. A 64 entry instruction buffer requires 6-bit addresses. Eight instructions is the maximum number of instructions that instruction buffer 110 is designed to receive concurrently. Five instructions is the maximum number of instructions instruction buffer 110 is designed to output concurrently. Concurrent instructions are defined to be a set of instructions having sequential addresses received and outputted in parallel by the processor.

Each memory sub-array 120A, 120B, 120C, 120D, 120E, 120F, 120G and 120H is identical and comprises 480 memory cells organized into 8 rows (each row coupled to a different wordline) by 60 columns (each column coupled to a different bitline). The number of bitlines can vary and is a function of the maximum number of bits in an instruction. An instruction is stored in 60 memory cells connected to a single wordline.

Since instruction buffer 110 is a write eight instructions instruction buffer, input rotator multiplexer 125 is the logical equivalent of a stack of eight 8:1 multiplexers. There are eight input buses for receiving instruction I0, I1, I2, I3, I4, I5, I6 and I7 from an instruction cache (not shown), each bus being as wide as the maximum number of bits in an instruction (in the present example 60 bits wide). There are eight different 60-bit write bitline buses from each 8:1 multiplexer (or equivalent) corresponding to memory sub-arrays 120A, 120B, 120C, 120D, 120E, 120F, 120G and 120H. The eight input buses may comprise 60-bit BLT buses, 60-bit BLC buses or 60-bit BLT buses and 60-bit BLC bus pairs. When only BLT buses are used, the BLC values are generated from the BLT values prior to writing to memory array 115. When only BLC buses are used, the BLT values are generated from the BLC values prior to writing to memory array 115. Which write bitline bus is connected to which sub-array 120A, 120B, 120C, 120D, 120E, 120F, 120G or 120H is a function of the design of input rotator multiplexer 125 and examples are illustrated in detail in FIGS. 3 and 4 and described infra.

Since instruction buffer 110 is a read five instructions instruction buffer, output multiplexer 130 is the logical equivalent of a stack of five 8:1 multiplexers. There are eight 60-bit read bitline buses, each coupled to a different and corresponding read bitline of a single and different memory-sub array 120A, 120B, 120C, 120D, 120E, 120F, 120G or 120H. Multiplexer 130 has five 60-bit output buses designated as R0, R1, R2, R3 and R4. A single instruction appears at each output. Output multiplexer 130 is illustrated in detail in FIG. 5 and described infra.

Since instruction buffer 110 is a 64-entry position, read five instructions instruction buffer, write address decoder 135 is coupled to memory array 115 by eight (64 entries divided by 8 instructions) 8-bit (number of instructions) write wordline buses. Each wordline bus is coupled to a different memory sub-array 120A, 120B, 120C, 120D, 120E, 120F, 120G or 120H. Each bit of a particular write wordline bus is coupled to a different write wordline select of a corresponding particular memory sub-array 120A, 120B, 120C, 120D, 120E, 120F, 120G or 120H.

It should be noted that memory array has 64 read wordlines and 64 write wordlines and that there are 8 read and 8 write wordlines in each sub-array. The first write wordline (or physical instruction entry) of the first memory sub-array, memory sub-array 120A, is physical and logical write wordline 0 of memory array 115. The next seven physically consecutive write wordlines in memory sub-array 120A are each eight logical write wordlines (or logical instruction entry positions) higher than the immediately previous write wordline. The first write wordline of the second memory sub-array, memory sub-array 120B, is physical write wordline 9 but logical write wordline 1 of memory array 115. The next seven physically consecutive write wordlines in memory sub-array 120B are each eight logical write wordlines (or instruction entry positions) higher than the immediately previous physical wordline. This pattern is repeated for remaining memory sub-arrays 120C, 120D, 120E, 120F, 120G and 120H. This means that each instruction of a set of eight concurrent instructions is written to a different memory sub-array 120A, 120B, 120C, 120D, 120E, 120F, 120G or 120H.

Specifically, the 8-bit write wordline bus from write address decoder 135 to memory sub-array 120A couples to logical write wordlines (or instruction entry positions) 0, 8, 16, 24, 32, 40, 48 and 56, the 8-bit write wordline bus from write address decoder 135 to memory sub-array 120B couples to logical write wordlines (or instruction entry positions) 1, 9, 17, 25, 33, 41, 49 and 59 and so forth until the 8-bit write wordline bus from write address decoder 135 to memory sub-array 120H couples to logical write wordlines (or instruction entry positions) 7, 15, 23, 31, 39, 47, 55 and 63. Therefore, eight instructions concurrently received at input rotator multiplexer 125 will be written to eight consecutive logical write wordlines located in physically different memory sub-arrays. Write decoder 135 is illustrated in detail in FIG. 7 and described infra.

Since instruction buffer 110 is a 64-entry positions write eight instructions instruction buffer, read address decoder 140 is coupled to memory array 115 by eight 8-bit read wordline buses. Each read wordline bus is coupled to a different memory sub-array 120A, 120B, 120C, 120D, 120E, 120F, 120G and 120H. Each bit of a particular read wordline bus is coupled to a different wordline of a corresponding particular memory sub-array 120A, 120B, 120C, 120D, 120E, 120F, 120G or 120H. The mapping of physical read wordlines to logical read wordlines is similar to that for mapping physical write wordlines to logical write wordlines described supra. Read decoder 140 is illustrated in detail in FIG. 6 and described infra.

Up to eight logically consecutive instructions are written to memory array 115 at sequential logical entry positions starting with the next available logical instruction entry position. For example, assume the first logical available instruction entry is 5. Then instructions will be written to the physical instruction entry positions as illustrated in TABLE I and there will be wrap between instruction I2 and I3. Wrap means that a concurrent set of instructions is not stored on the same physical wordline position of each memory sub-array, but is shifted over one wordline and occurs when a set of concurrent instructions are written down to the last memory sub array and more sub-arrays are required to hold the rest of the set of concurrent instructions.

TABLE I

| Instruction | I0 | I1 | I2 | I3 | I4 | I5 | I6 | I7 |
|---|---|---|---|---|---|---|---|---|
| Logical Entry | 5 | 6 | 7 | 8 | 9 | 10 | 11 | 12 |
| Sub-array | SA5 | SA6 | SA7 | SA0 | SA1 | SA2 | SA3 | SA4 |
| Sub-array Wordline | 0 | 0 | 0 | 1 | 1 | 1 | 1 | 1 |

Up to five consecutive instructions are read from memory array 115 starting at the logical entry of instruction I0. For example, assume the first instruction (I0) is stored at logical instruction entry 21. Then instructions will be read from the physical instruction entry positions as illustrated in TABLE II. Instruction sequence is corrected by select signals applied to output multiplexer 130.

TABLE II

| Logical Entry | 21 | 22 | 23 | 24 | 25 |
|---|---|---|---|---|---|
| Sub-array | SA5 | SA6 | SA7 | SA0 | SA1 |
| Sub-array Wordline (of wordlines 0–7) | 2 | 2 | 2 | 3 | 3 |
| Instruction | I0 | I1 | I2 | I3 | I4 |
| Readout Order | 1 | 2 | 3 | 4 | 5 |

Figure 8:
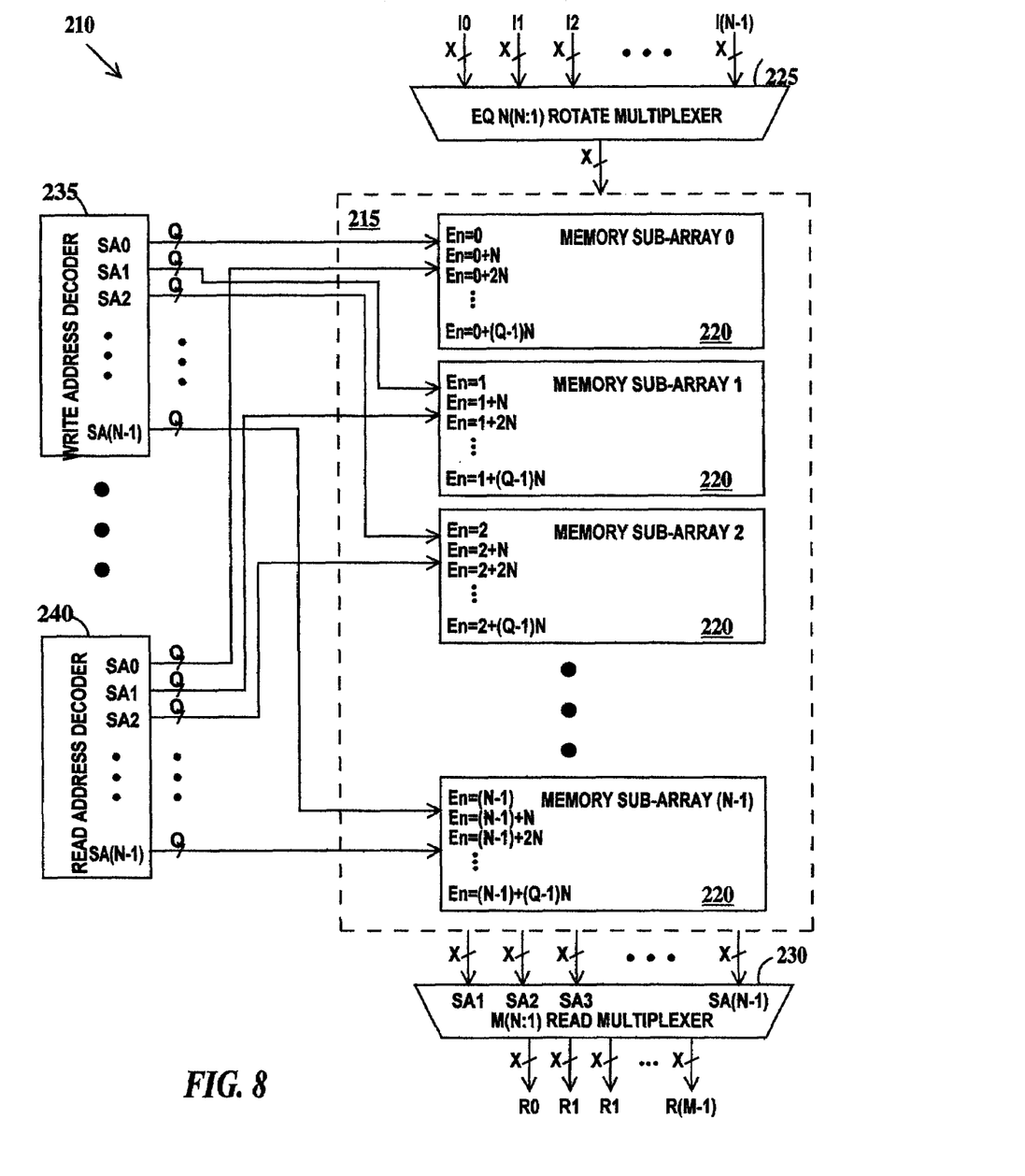
FIG. 8 is a block schematic diagram of a general case instruction buffer utilizing a single write port, single read port storage according to the present invention.

It should be note that the number of write and the number of read ports is less than the number of concurrent instructions to be written or to be read respectively. A general case instruction buffer according to the present invention is illustrated in FIG. 8 and described infra.

Figure 3:
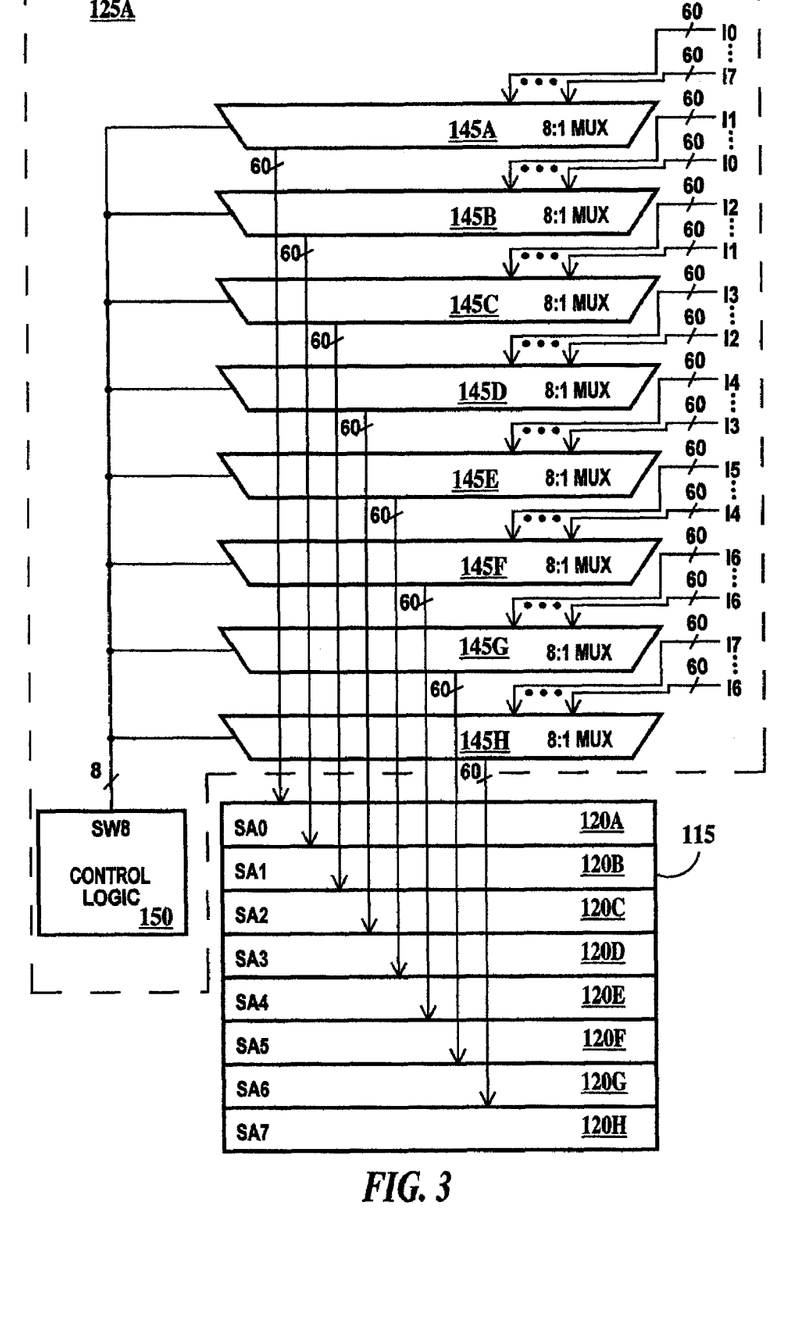
FIG. 3 is a block schematic diagram of a first exemplary data input rotator multiplexer of FIG. 2.

FIG. 3 is a block schematic diagram of a first exemplary data input rotator multiplexer 125A. In FIG. 3, input rotator multiplexer 125A includes eight 8:1 multiplexers 145A, 145B, 145C, 145D, 145E, 145F, 145G and 145H. The eight inputs of each 8:1 multiplexer 145A, 145B, 145C, 145D, 145E, 145F, 145G and 145H are coupled to eight 60-bit input buses for receiving instructions I0, I1, I2, I3, I4, I5, I6 and I7 respectively. The output bus (60-bits wide) of each 8:1 multiplexer 145 is coupled to corresponding write bitline of different groups of memory sub-arrays 120A, 120B, 120C, 120D, 120E, 120F, 120G and 120H. The output bus of first 8:1 multiplexer 145A is coupled to memory sub-array 120A. The output bus of second 8:1 multiplexer 145B is coupled to memory sub-array 120B. The output bus of third 8:1 multiplexer 145C is coupled to memory sub-array 120C. The output bus of fourth 8:1 multiplexer 145D is coupled to memory sub-array 120D. The output bus of fifth 8:1 multiplexer 145E is coupled to memory sub-array 120E. The output bus of sixth 8:1 multiplexer 145F is coupled to memory sub-array 120F. The output bus of seventh 8:1 multiplexer 145G is coupled to memory sub-array 120G. The output bus of eighth 8:1 multiplexer 145H is coupled to memory sub-array 120H.

The select input for each 8:1 multiplexer 145A, 145B, 145C, 145D, 145E, 145F, 145G and 145H is coupled to a control logic 150. Control logic 150 keeps track of the next available logical entry in memory array 115 (see FIG. 3) and generates a fully decoded 8-bit select signal SW8 to "rotate" the incoming instructions I0, I1, I2, I3, I4, I5, I6 and I7 into the next eight available instruction entry positions. This address is generated by write decoder 135 (see FIG. 8). While simple to design, a stack of eight 8:1 multiplexers and the connection to a memory array can require a large silicon area and a large numbers of wires. The logical to physical instruction entry mapping described supra allows simpler rotator multiplexer designs. One such example will now be discussed.

Figure 4:
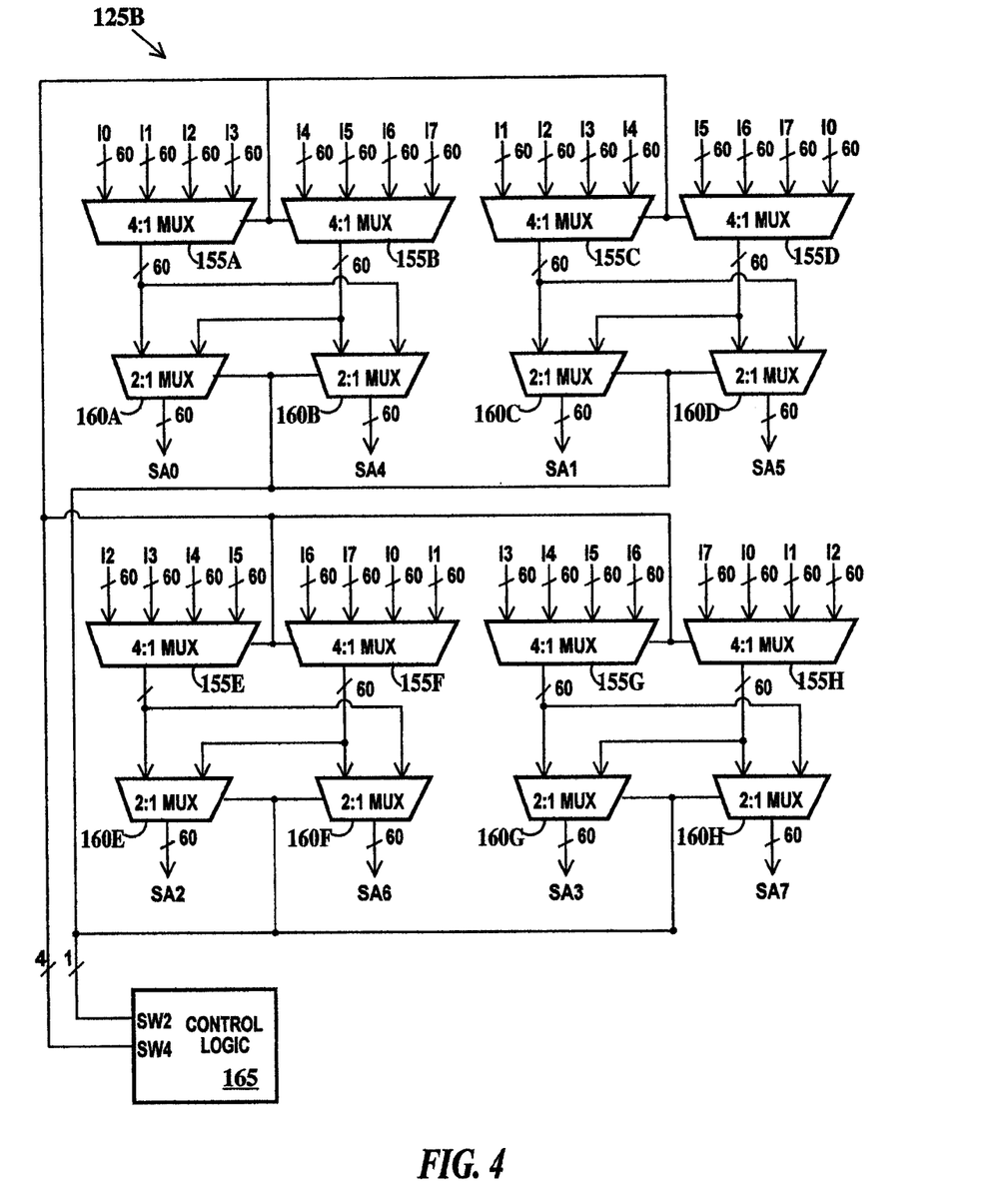
FIG. 4 is a block schematic diagram of a second exemplary data input rotator multiplexer of FIG. 2.

FIG. 4 is a block schematic diagram of a second exemplary data input rotator multiplexer 125B. In FIG. 4, input rotator multiplexer 125B includes eight 4:1 multiplexers (155A, 155B, 155C, 155D, 155E, 155F, 155G and 155H) and eight 2:1 multiplexers (160A, 160B, 160C, 160D, 160E, 160F, 160G and 160H).

The first, second, third and fourth inputs of 4:1 multiplexers 155A are coupled respectively to the 60-bit bitline buses for receiving in instructions I0, I1, I2, and I3 and the first, second, third and fourth inputs of 4:1 multiplexer 155B are coupled respectively to the 60-bit write bitline buses for receiving instruction I4, I5, I6, and I7. The first, second, third and fourth inputs of 4:1 multiplexers 155C are coupled respectively to the 60-bit bitline for receiving in instructions I1, I2, I3, and I4 and the first, second, third and fourth inputs of 4:1 multiplexer 155D are coupled respectively to the 60-bit write bitline buses for receiving instruction I5, I6, I7, and I0. The first, second, third and fourth inputs of 4:1 multiplexers 155E are coupled respectively to the 60-bit bitline buses for receiving in instructions I2, I3, I4, and I5 and the first, second, third and fourth inputs of 4:1 multiplexer 155F are coupled respectively to the 60-bit write bitline for receiving instruction I6, I7, I0, and I1. The first, second, third and fourth inputs of 4:1 multiplexers 155G are coupled respectively to the 60-bit bitline buses for receiving in instructions I3, I4, I5, and I6 and the first, second, third and fourth inputs of 4:1 multiplexer 155H are coupled respectively to the 60-bit write bitline buses for receiving instruction I7, I0, I1, and I2.

The output of 4:1 multiplexer 155A is coupled to the first input of 2:1 multiplexers 160A and second input of 160B and the output of 4:1 multiplexer 155B are coupled to the second input of 2:1 multiplexers 160A and the first input 160B. The output of 4:1 multiplexer 155C is coupled to the first input of 2:1 multiplexers 160C and the second input of 160D and the output of 4:1 multiplexer 155D are coupled to the second input of 2:1 multiplexers 160C and the first input 160D. The output of 4:1 multiplexer 155E is coupled to the first input of 2:1 multiplexers 160E and the second input of 160F and the output of 4:1 multiplexer 155F are coupled to the second input of 2:1 multiplexers 160F and the first input 160F. The output of 4:1 multiplexer 155G is coupled to the first input of 2:1 multiplexers 160G and the second input of 160H and the output of 4:1 multiplexer 155H are coupled to the second input of 2:1 multiplexers 160G and the first input 160H.

The output of 2:1 multiplexer 160A is coupled to corresponding write bitlines in memory sub-array 120A. The output of 2:1 multiplexer 160B is coupled to corresponding write bitline in memory sub-array 120E. The output of 2:1 multiplexer 160C is coupled to corresponding write bitlines in memory sub-array 120B. The output of 2:1 multiplexer 160D is coupled to corresponding write bitlines in sub-array 120F. The output of 2:1 multiplexer 160E is coupled to corresponding write bitlines in memory sub-array 120C. The output of 2:1 multiplexer 160F is coupled to corresponding write bitlines in memory sub-array 120G. The output of 2:1 multiplexer 160G is coupled to corresponding write bitlines in memory sub-array 120C. The output of 2:1 multiplexer 160H is coupled to corresponding write bitlines in memory sub-array 120H.

Thus, a portion of the rotation required is accomplished by the interconnections of rotator multiplexer 125B and multiplexer select signals may be simplified. All 4:1 multiplexers 155A, 155B, 155C, 155D, 155E, 155F, 155G and 155H share the same decoded 4-bit select signal SW4 and all 2:1 multiplexers 160A, 160B, 160C, 160D, 160E, 160F, 160G and 160H share the same 1-bit select signal SW2 generated by control logic 165 based on the physical location in memory array 115 of the first available instruction entry position. Control logic 165 keeps track of the next available logical entry in memory array 115 (see FIG. 2) and generates the 5 bits of select signals SW2 and SW4 based on the address of the physical location in memory array 115 (see FIG. 2) of the first instruction that is to be available to be written to. (There must also be sufficient available sequential logical instruction entry positions to hold the entire set of concurrent instructions.) This address is generated by write decoder 140 (see FIG. 2). For example with SW4 set to select input 3 of all 4:1 multiplexers 155A, 155B, 155C, 155D, 155E, 155F, 155G and 155H and SW2 set to select input 1 of all 2:1 multiplexers 160A, 160B, 160C, 160D, 160E, 160F, 160G and 160H, then SA0 receives instruction I2, SA1 receives instruction I3, SA2 receives instruction I4, SA3 receives instruction I5, SA4 receives instruction I6, SA5 receives instruction I7, SA6 receives instruction I0 and SA7 receives instruction I1. The instructions are in sequential order I2, I3, I4, I5, I6, I7, I0 and I1 though wrapped.

Figure 5:
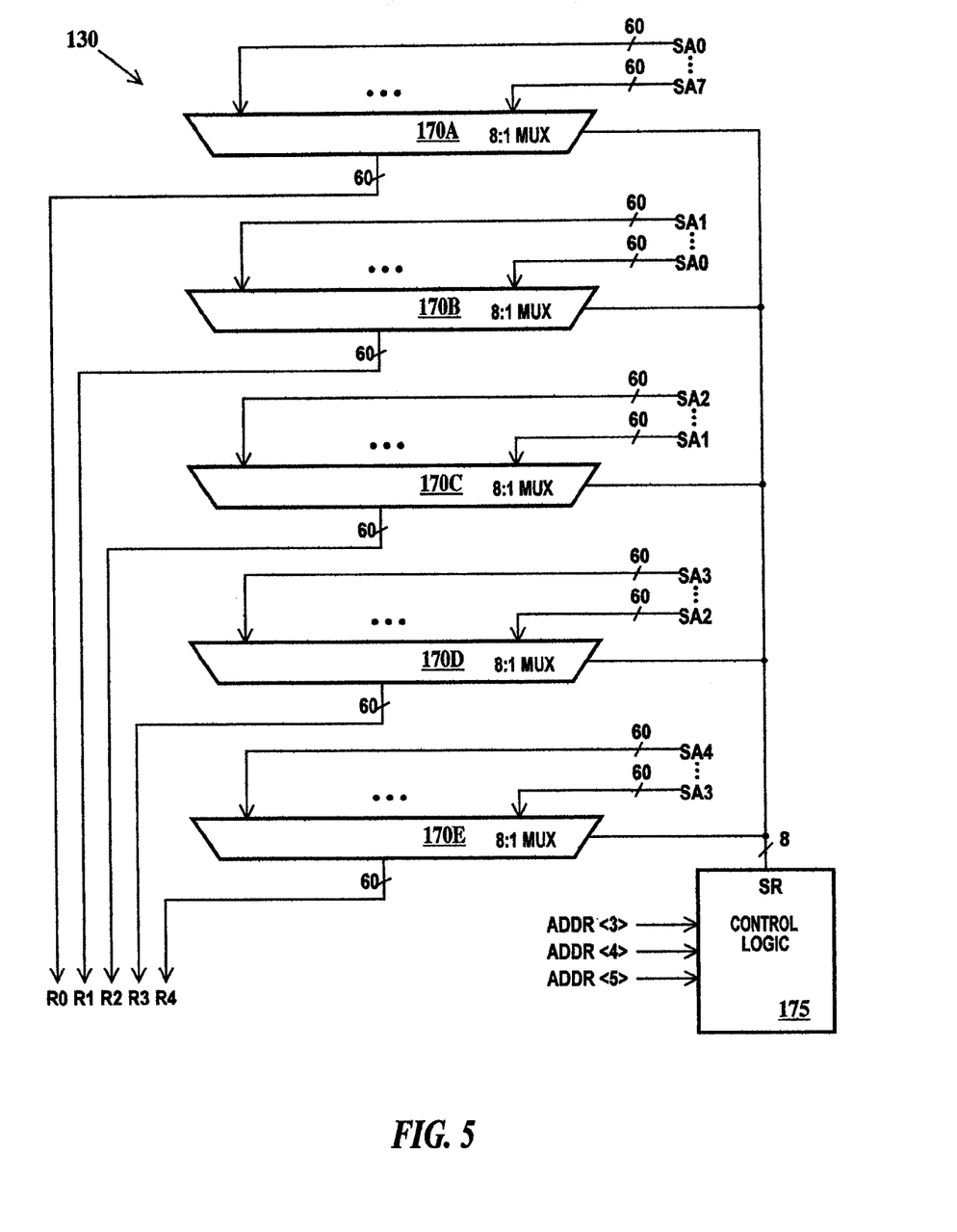
FIG. 5 is a block schematic diagram of an exemplary output multiplexer of FIG. 2.

FIG. 5 is a block schematic diagram of an exemplary output multiplexer 130 of FIG. 2. In FIG. 5, output multiplexer 130 includes five 8:1 multiplexers 170A, 170B, 170C, 170D and 170E. Each 8:1 multiplexer 170A, 170B, 170C, 170D and 170E is coupled to the same eight 60-bit read bitline buses but in a different order. Input buses to 8:1 multiplexer 170A are in the order SA0, SA1, SA2, SA3, SA4, SA5, SA6 and SA7. Input buses to 8:1 multiplexer 170B are in the order SA1, SA2, SA3, SA4, SA5, SA6, SA7 and SA0. Input buses to 8:1 multiplexer 170C are in the order SA2, SA3, SA4, SA5, SA6, SA7, SA0 and SA1. Input buses to 8:1 multiplexer 170D are in the order SA3, SA4, SA5, SA6, SA7, SA0, SA1 and SA2. Input buses to 8:1 multiplexer 170E are in the order SA4, SA5, SA6, SA7, SA0, SA1, SA2 and SA3. Each read bitline bus is coupled to a different and corresponding read bitline of a single and different memory-sub array SA0, SA1, SA2, SA3, SA4, SA5, SA6 through SA7. Each 8:1 multiplexer 170A, 170B, 170C, 170D and 170E has a 60-bit output bus corresponding to five result outputs R0, R1, R2, R3 and R4.

Control logic 175 decodes the read address bits ADDR<3:5> only from the starting (first) read address into an 8-bit select signal which is applied to the select input of each of the five 8:1 multiplexers 170A, 170B, 170C, 170D and 170E respectively in order to ensure that instruction I0 appears at output R0, instruction I1 at output R1, instruction I2 at output R2, instruction I3 at output R3 and instruction I4 at output R4. Select signal SR is generated by control logic 175 based on the address of the physical location in memory array 115 (see FIG. 3) of the first instruction (I0) that is to be read out.

Note, prior art write 8/read 5 instruction buffers require a full 6-bit wordline address decode for not only the first instruction's wordline address but also for all subsequent instruction wordline addresses. This entails four additional serial increments of the first address to obtain all five wordline addresses. Thus, the present invention saves decode time (is faster than the prior art) and since there are less circuits required, the present inventions uses less integrated circuit chip area.

Figure 6:
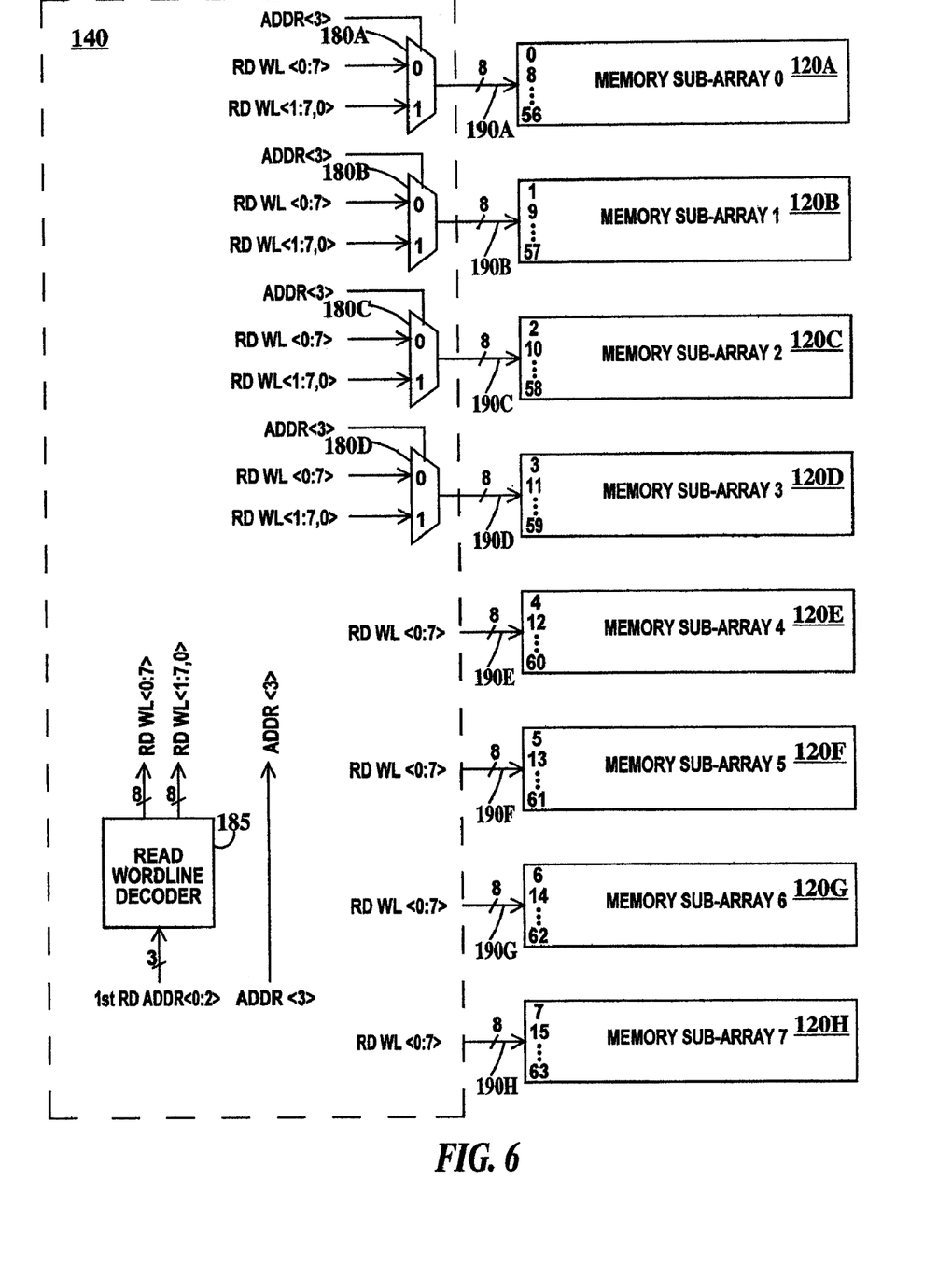
FIG. 6 is a block schematic diagram of an exemplary read decoder of FIG. 2.

FIG. 6 is a block schematic diagram of an exemplary read decoder 140 of FIG. 3. In FIG. 6, read address decoder 140 includes four 2:1 multiplexers 180A, 180B, 180C and 180D, a read wordline decoder 185 and eight output buses 190A, 190B, 190C, 190D, 190E, 190F, 190G and 190H.

Addresses of wordlines are coded into a six bit read address (RD ADDR<0:5>) wherein bits<3:5> specify the starting memory sub-array 120A, 120B, 120C, 120D, 120E, 120F, 120G or 120H, and bits <0:2> indicate the wordline in the particular memory sub-array. Six bits support 64 unique wordline addresses. Read wordline decoder 185 operates on the first 3 bits (<0:2>) of 6-bit address (1st RD ADDR <0:5>) of the first instruction entry to be read out. First a 3-bit to 8-bit decode using bits <0:2> of 1st RD ADDR <0:5> is performed to generate an 8-bit read wordline address (RD WL <0:7>). RD WL <0:7> is shifted by one bit to obtain RD WL <1:7,0>. RD WL <0:7> is coupled to the 0 select input of multiplexers 180A, 180B, 180C and 180D as well as the address select circuits of memory sub-arrays 120E, 120F, 120G and 120H. RD WL <1:7,0> is coupled to the 1 select input of multiplexers 180A, 180B, 180C and 180D. The output of multiplexers 180A, 180B, 180C and 180D is coupled to respective address select circuits of memory sub-arrays 120A, 120B, 120C and 120D. The select input of multiplexers 180A, 180B, 180C and 180D is coupled to ADDR <3>.

This decode scheme, takes advantage of the fact that there are only eight possible ways five concurrent instructions can be stored in memory sub-arrays 120A, 120B, 120C, 120D, 120E, 120F, 120G and 120H as illustrated in TABLE III.

TABLE III

| FIRST INSTRUCTION | FIFTH INSTRUCTION | WRAP |
|---|---|---|
| Memory sub-array 120A (SA0) | Memory sub-array 120E (SA4) | No |
| Memory sub-array 120B (SA1) | Memory sub-array 120F (SA5) | No |
| Memory sub-array 120C (SA2) | Memory sub-array 120G (SA6) | No |
| Memory sub-array 120D (SA3) | Memory sub-array 120H (SA7) | No |
| Memory sub-array 120E (SA4) | Memory sub-array 120A (SA0) | Yes |
| Memory sub-array 120F (SA5) | Memory sub-array 120B (SA1) | Yes |
| Memory sub-array 120G (SA6) | Memory sub-array 120C (SA2) | Yes |
| Memory sub-array 120H (SA7) | Memory sub-array 120D (SA3) | Yes |

An example of how this "quick" address decode works is illustrated in Table IV where it is assumed five instructions are to be read from logical instruction entry positions 21, 22, 23, 24 and 25.

TABLE IV

| Entry | ADDR <0:2> | ADDR <3:5> | WL Pos | Sub Array | ADDR <0:2> in 8-bit code | RD WL ADDR <1:7,0> (Shifted Entry 21) |
|---|---|---|---|---|---|---|
| 21 | 0 1 0 | 1 0 1 | 2 | SA5 | 0 0 0 0 0 1 0 0 | |
| 22 | 0 1 0 | 1 1 0 | 2 | SA6 | 0 0 0 0 0 1 0 0 | |
| 23 | 0 1 0 | 1 1 1 | 2 | SA7 | 0 0 0 0 0 1 0 0 | |
| 24 | 0 1 1 | 0 0 0 | 3 | SA0 | | 0 0 0 0 1 0 0 0 |
| 25 | 0 1 1 | 0 0 1 | 3 | SA1 | | 0 0 0 0 1 0 0 0 |

Note, only address 21 was decoded, addresses 22–25 were derived from address 21.

Instructions 21, 22 and 23 can use RD WL <0:7> because that is the actual wordline address of entry positions 21, 22 and 23. Instructions 24 and 25 can use RD WL <1:7,0> because that shift results in the actual addresses of entry positions 24 and 25.

Figure 7:
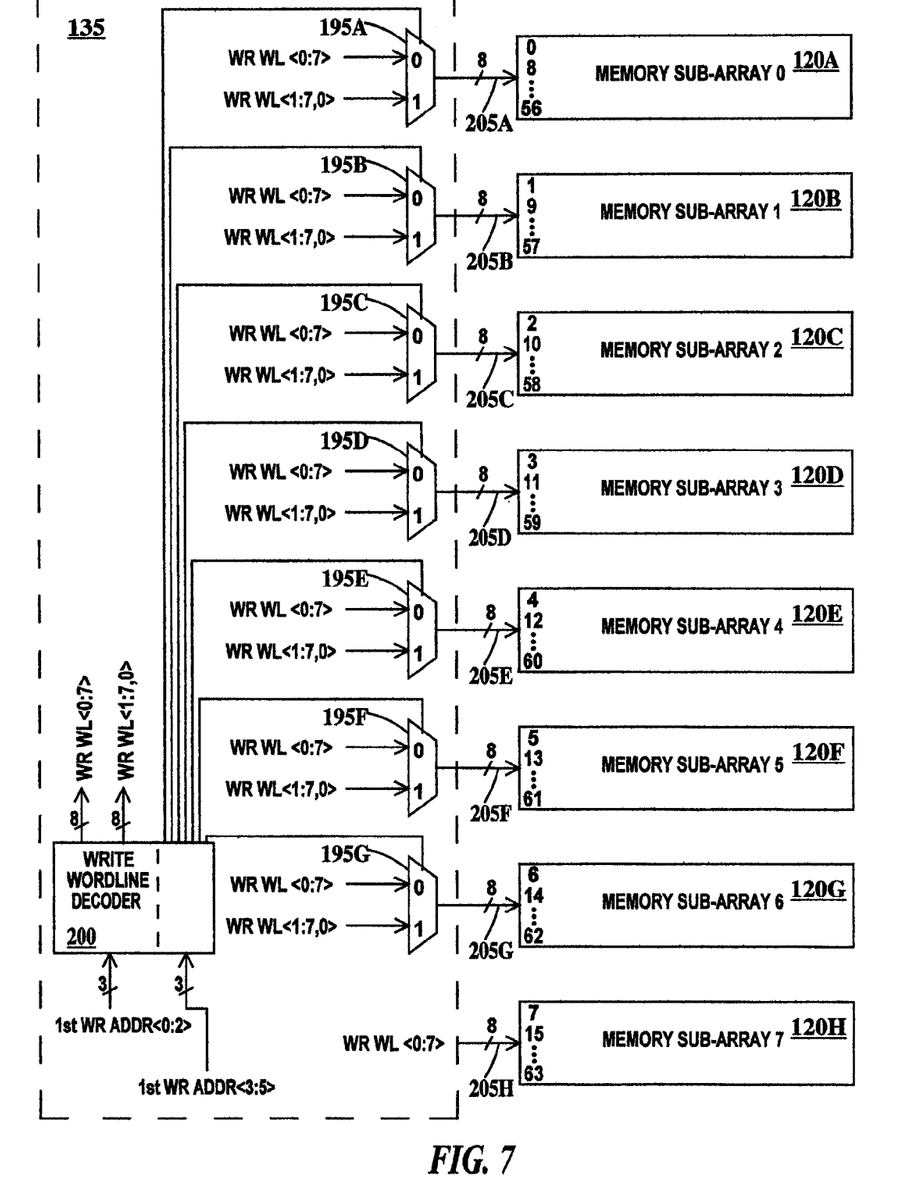
FIG. 7 is a block schematic diagram of an exemplary write decoder of FIG. 2.

FIG. 7 is a block schematic diagram of an exemplary write decoder 135 of FIG. 3. In FIG. 7, write address decoder 135 includes seven 2:1 multiplexers 195A, 195B, 195C, 195D, 195E, 195F and 195G, a write wordline decoder 200 and eight output buses 205A, 205B, 205C, 205D, 205E, 205F, 205G and 205H.

Addresses of wordlines are coded into a six bit write address (WR ADDR<0:5>) wherein bits<3:5> specify the starting memory sub-array 120A, 120B, 120C, 120D, 120E, 120F, 120G or 120H, and bits <0:2> indicate the wordline in the particular memory sub-array. Write wordline decoder 200 operates only on the first address (1st WR ADDR <0:5>) of the first instruction entry to be written in. First a 3-bit to 8-bit decode using bits <0:2> of 1st WR ADDR <0:5> is performed to generate an 8-bit write wordline address (WR WL <0:7>). WR WL <0:7> is shifted by one bit to obtain WR WL <1:7,0>. WR WL <0:7> is coupled to the 0 select input of multiplexers 195A, 195B, 195C, 195D, 195E, 195F and 195G as well as the address select circuits of memory sub-120H. RD WL <1:7,0> is coupled to the 1 select input of multiplexers 195A, 195B, 195C, 195D, 195E, 195F and 195G. The output of multiplexers 195A, 195B, 195C, 195D, 195E, 195F and 195G is coupled to respective address select circuits of memory sub-arrays 120A, 120B, 120C, 120D, 120E, 120F and 120G. The select inputs of multiplexers 195A, 195B, 195C, 195D, 195E, 195F and 195G are generated from ADDR <3:5> by logic circuits within write decoder 135.

The generation of write addresses is similar the generation of read addresses discussed supra with the exception that instead of the address of the first instruction entry to be read out, the address of the first available instruction entry in array 115 (see FIG. 2) is used as the seed address.

There are only eight possible ways eight concurrent instructions can be stored in memory sub-arrays 120A, 120B, 120C, 120D, 120E, 120F, 120G and 120H as illustrated in TABLE V.

TABLE V

| FIRST INSTRUCTION | EIGHTH INSTRUCTION | WRAP |
| --- | --- | --- |
| Memory sub-array 120A (SA0) | Memory sub-array 120H (SA7) | No |
| Memory sub-array 120B (SA1) | Memory sub-array 120A (SA0) | Yes |
| Memory sub-array 120C (SA2) | Memory sub-array 120B (SA1) | Yes |
| Memory sub-array 120D (SA3) | Memory sub-array 120C (SA2) | Yes |
| Memory sub-array 120E (SA4) | Memory sub-array 120D (SA3) | Yes |
| Memory sub-array 120F (SA5) | Memory sub-array 120E (SA4) | Yes |
| Memory sub-array 120G (SA6) | Memory sub-array 120F (SA5) | Yes |
| Memory sub-array 120H (SA7) | Memory sub-array 120G (SA6) | Yes |

An example of how this "quick" address decode works is illustrated in Table VI where it is assumed eight instructions are to be written to logical instruction entry positions 23, 24, 25, 26, 27 and 28.

TABLE VI

| Entry | ADDR <0:2> | ADDR <3:5> | WL Pos | Sub Array | ADDR <0:2> in 8-bit code | WR WL ADDR<1:7,0> (Shifted Entry 21) |
| --- | --- | --- | --- | --- | --- | --- |
| 21 | 0 1 0 | 1 0 1 | 2 | SA5 | 0 0 0 0 0 1 0 0 | |
| 22 | 0 1 0 | 1 1 0 | 2 | SA6 | 0 0 0 0 0 1 0 0 | |
| 23 | 0 1 0 | 1 1 1 | 2 | SA7 | 0 0 0 0 0 1 0 0 | |
| 24 | 0 1 1 | 0 0 0 | 3 | SA0 | | 0 0 0 0 1 0 0 0 |
| 25 | 0 1 1 | 0 0 1 | 3 | SA1 | | 0 0 0 0 1 0 0 0 |
| 26 | 0 1 1 | 0 1 1 | 3 | SA2 | | 0 0 0 0 1 0 0 0 |
| 27 | 0 1 1 | 1 0 0 | 3 | SA3 | | 0 0 0 0 1 0 0 0 |
| 28 | 0 1 1 | 1 0 1 | 3 | SA4 | | 0 0 0 0 1 0 0 0 |

Note, only address 21 was decoded, addresses 22–28 were derived from address 21.

Instructions 21, 22 and 23 can use WRD WL <0:7> because that is the actual wordline address of entry positions 21, 22 and 23. Instructions 24, 25, 26, 27 and 28 can use WR WL <1:7,0> because that shift results in the actual addresses of entry positions 24, 25, 26, 27 and 28.

FIG. 8 is a block schematic diagram of a general case instruction buffer utilizing single write port, single read port storage according to the present invention. In FIG. 8, instruction buffer 210 includes a memory array 215 comprised of N memory sub-arrays 220, an input rotator multiplexer 225, an output multiplexer 230, a write address decoder 235 and a read address decoder 240.

Instruction buffer 210 is an N×Q instruction-entry, write N instructions and read M instructions instruction buffer. N instructions are the maximum number of instructions instruction buffer 210 is designed to write in concurrently. M instructions are the maximum number of instructions instruction buffer 210 is designed to read out concurrently. It should be noted that the number of memory sub arrays is equal to the maximum number, N, of concurrent write instructions.

Each memory sub-array 220 is identical and comprises Q×X memory cells organized into Q rows (each row coupled to a different wordline) by X columns (each column coupled to a different bitline). An instruction is stored in the X memory cells connected to a single wordline. The physical wordlines in each memory sub-array 220 are N logical wordlines apart. The same physical wordline positions in adjacent memory sub-arrays 220 are one logical wordline apart.

Since instruction buffer 210 is a write N instructions instruction buffer, input rotator multiplexer 225 is the logical equivalent of a stack of N (N:1) multiplexers. There are N input buses for receiving instruction I0 through I(N−1) from an instruction cache (not shown), each bus is X-bits wide. There are N different X-bit write bitline buses from each N:1 multiplexer (or equivalent) each connected to a different memory sub-array 220. The N input buses may comprise X-bit BLT buses, X-bit BLC buses or X-bit BLT and X-bit BLC bus pairs. When only BLT buses are used, the BLC values are generated from the BLT values prior to writing to memory array 215. When only BLC buses are used, the BLT values are generated from the BLC values prior to writing to memory array 215.

Since instruction buffer 210 is a read M instructions instruction buffer, output multiplexer 230 is the logical equivalent of a stack of M (N:1) multiplexers. There are N X-bit read bitline buses, each coupled to a different and corresponding read bitline of a single and different memory-sub array 220. Multiplexer 230 has M X-bit output buses corresponding to the designated as R0 through RM.

Each wordline bus is coupled to a different memory sub-array 220. Each bit of a particular write wordline bus is coupled to a different write wordline of a corresponding particular memory sub-array 220.

In the present example, M is less than or equal to N. In the present example, N is a power of 2 in order to keep address decoding relatively simple.

Thus, the present invention provides an instruction buffer capable of supporting multiple writes and multiple reads concurrently and requiring a minimum amount of memory area and providing fast access.

The description of the embodiments of the present invention is given above for the understanding of the present invention. It will be understood that the invention is not The invention claim is:

1. An instruction buffer, comprising:
a physical memory array partitioned into multiple physical and identical memory sub-arrays arranged in sequential order from a first memory sub-array to a last memory sub-array, each memory sub-array having multiple physical instruction entry positions and adapted to store a different instruction of a set of concurrent instructions in a single instruction entry position of any one of said memory sub-arrays, said set of concurrent instructions arranged in sequential order from a first instruction to a last instruction;
a rotator multiplexer adapted to receive said set of concurrent instructions and direct each instruction of said set of concurrent instructions to an entry position in different consecutive memory sub-arrays;
an output multiplexer adapted to order a sequence of instructions read out of said memory array to match the order of instructions in said set of concurrent instructions;
a write address decoder adapted to determine a write address of a wordline of said memory array to which said first instruction of said set of instructions will be written;
a read address decoder adapted to determine a read address of a wordline of said memory array from which a first instruction of a group of instructions will be read from;
wherein a number of write ports is less than a number of instructions to be written into said memory array and a number of read ports is less than a number of instructions to be read out of said memory array;
wherein each instruction entry position is defined by a physical instruction entry position and a corresponding logical instruction entry position, each logical instruction entry position in a particular memory sub-array is a fixed number higher than an immediately previous logical instruction entry position in said particular memory sub-array;
wherein said physical instruction entry positions in each memory sub-array are one logical instruction entry position higher than corresponding physical entry positions of a immediately previous memory sub-array, the first physical instruction entry position and first logical instruction entry position of a first memory sub-array being the same; and
wherein each said instruction of said set of concurrent instructions is stored in consecutive logical instruction entry positions of said memory array.

2. The instruction buffer of claim 1, wherein:
each instruction of said set of concurrent instructions is stored in a different memory sub-array and the set of concurrent instructions may wrap from said last memory sub-array to said first memory sub-array.

3. The instruction buffer of claim 2, wherein when said set of concurrent instruction wraps around, each instruction that is wrapped is written to an instruction entry position in a corresponding memory sub-array that is one instruction entry position higher in a memory sub-array corresponding to each instruction that is not wrapped except an instruction wrapped from the last instruction entry position of the last memory sub-array wraps to the first instruction entry position of the first memory sub-array.

4. The instruction buffer of claim 1, wherein each memory sub-array comprises single write port and single read port memory cells.

5. The instruction buffer of claim 1, wherein:
a maximum number of instructions in said set of concurrent instructions is equal to N instructions;
said rotator multiplexer comprises N, N:1 multiplexers, each multiplexer adapted to select one of said N instructions and couple the selected instruction to one of said memory sub-arrays.

6. The instruction buffer of claim 1, wherein:
a maximum number of instructions in said set of concurrent instructions is equal to N instructions;
said rotator multiplexer comprises:
N, (N/2):1 first multiplexers arranged in pairs, each first multiplexer adapted to select one instruction from a different sequence of N/2 different sequences of instructions of said set of concurrent instructions;
N, (2:1) second multiplexers arranged in pairs, each first multiplexer adapted to select one instruction from a corresponding pair of said first (N/2):1 multiplexers and couple the selected instructions to the inputs of different memory sub-arrays.

7. The instruction buffer of claim 6, wherein:
a number of physical entry positions in each said memory sub-array is equal to Q;
N is equal to 8 and Q is equal to 8;
the first instruction in said set of concurrent instructions has a physical instruction entry position defined by a 6-bit address, a first set of 3-bits of said 6-bit address defining a physical entry position in each memory sub-array and a second set of 3-bits of said 6-bit address defining a position of said sub-array in said memory array; and
said write address decoder comprises:
a write wordline decoder adapted to generate an 8-bit address of said first set of 3-bits and a 1-bit to the left shifted 8-bit address of said 8-bit address;
seven 2:1 address multiplexers, an output of each address multiplexer coupled to a corresponding wordline select of seven sequential memory sub-arrays beginning with said first memory sub-array, a first input of each address multiplexer coupled to said 8-bit address, a second input of each address multiplexer coupled to said shifted 8-bit address and the select input of each address multiplexer coupled to a logic circuit, said logic circuit coupled to said second set of 3-bits; and
said 8-bit address coupled to a wordline select of said last memory sub-array.

8. The instruction buffer of claim 6, wherein:
a number of said physical entry positions in each said memory sub-array is equal to Q;
a maximum number of instructions in said set of concurrent instructions to be read out of said memory array concurrently is equal to M;
N is equal to 8 and Q is equal to 8;
the first instruction in said set of concurrent instructions has a physical instruction entry position defined by a 6-bit address, a first set of 3-bits of said 6-bit address defining a physical entry position in each memory sub-array and a second set of 3-bits of said 6-bit address defining a position of said sub-array in said memory array; and said read address decoder comprises:
- a read wordline decoder adapted to generate an 8-bit address of said first set of 3-bits and a 1-bit to the left shifted 8-bit address of said 8-bit address;
- (M−1) 2:1 address multiplexers, an output of each address multiplexer coupled to a corresponding wordline select of (M−1) consecutive memory sub-arrays starting with said first memory sub-array, a first input of each address multiplexer coupled to said 8-bit address, a second input of each address multiplexer coupled to said shifted 8-bit address and the select input of each address multiplexer coupled to one bit of said second set of 3-bits; and
- said 8-bit address coupled to a wordline select of the each memory sub-arrays not coupled to an output of one of said (M−1) 2:1 multiplexers.

9. The instruction buffer of claim 8, wherein M is equal to 5.

10. The instruction buffer of claim 1, wherein:
a maximum number of instructions to be read out of said memory array concurrently is M instructions; and
said output multiplexer comprises M, N:1 multiplexers.

11. The instruction buffer of claim 1, wherein:
a maximum number of instructions in said set of concurrent instructions is equal to N instructions;
a number of said memory sub-arrays in said memory array is N;
a number of said physical entry positions in each said memory sub-array is equal to Q; and
Q may or may not be equal to N.

12. The instruction buffer of claim 1, wherein each memory sub-array is selected from the group consisting of static random access memory arrays, dynamic random access memory arrays, latch arrays, or a register array.

13. A method of buffering instructions for a processor, comprising:
providing a physical memory array partitioned into multiple physical and identical memory sub-arrays arranged in sequential order from a first memory sub-array to a last memory sub-array, each memory sub-array having multiple physical instruction entry positions and adapted to store a different instruction of a set of concurrent instructions in a single instruction entry position of any one of said memory sub-arrays, said set of concurrent instructions arranged in sequential order from a first instruction to a last instruction;
providing a rotator multiplexer adapted to receive said set of concurrent instructions and direct each instruction of said set of concurrent instructions to an entry position in different consecutive memory sub-arrays;
providing an output multiplexer adapted to order a sequence of instructions read out of said memory array to match the order of instructions in said set of concurrent instructions;
providing a write address decoder adapted to determine a write address of a wordline of said memory array to which said first instruction of said set of instructions will be written;
providing a read address decoder adapted to determine a read address of a wordline of said memory array from which a first instruction of a group of instructions will be read from;
writing and reading instructions of said set of concurrent instructions to and from said memory array;
wherein a number of write ports is less than a number of instructions to be written into said memory array and a number of read ports is less than a number of instructions to be read out of said memory array;
wherein each instruction entry position is defined by a physical instruction entry position and a corresponding logical instruction entry position, each logical instruction entry position in a particular memory sub-array is a fixed number higher than an immediately previous logical instruction entry position in said particular memory sub-array;
wherein said physical instruction entry positions in each memory sub-array are one logical instruction entry position higher than corresponding physical entry positions of a immediately previous memory sub-array, the first physical instruction entry position and first logical instruction entry position of a first memory sub-array being the same; and
wherein each said instruction of said set of concurrent instructions is stored in consecutive logical instruction entry positions of said memory array.

14. The method of claim 13, wherein:
each instruction of said set of concurrent instructions is stored in a different memory sub-array and the set of concurrent instructions may wrap from said last memory sub-array to said first memory sub-array.

15. The method of claim 14, wherein when said set of concurrent instruction wraps around, each instruction that is wrapped is written to an instruction entry position in a corresponding memory sub-array that is one instruction entry position higher in a memory sub-array corresponding to each instruction that is not wrapped except an instruction wrapped from the last instruction entry position of the last memory sub-array wraps to the first instruction entry position of the first memory sub-array.

16. The method of claim 13, wherein each memory sub-array comprises single write port and single read port memory cells.

17. The method of claim 13, wherein:
a maximum number of instructions in said set of concurrent instructions is equal to N instructions;
said rotator multiplexer comprises N, N:1 multiplexers, each multiplexer adapted to select one of said N instructions and couple the selected instruction to one of said memory sub-arrays.

18. The method of claim 13, wherein:
a maximum number of instructions in said set of concurrent instructions is equal to N instructions;
said rotator multiplexer comprises:
N, (N/2):1 first multiplexers arranged in pairs, each first multiplexer adapted to select one instruction from a different sequence of N/2 different sequences of instructions of said set of concurrent instructions;
N, (2:1) second multiplexers arranged in pairs, each first multiplexer adapted to select one instruction from a corresponding pair of said first (N/2):1 multiplexers and couple the selected instructions to the inputs of different memory sub-arrays.

19. The method of claim 18, wherein:
a number of said physical entry positions in each said memory sub-array is equal to Q;
N is equal to 8 and Q is equal to 8;
the first instruction in said set of concurrent instructions has a physical instruction entry position defined by a 6-bit address, a first set of 3-bits of said 6-bit address defining a physical entry position in each memory sub-array and a second set of 3-bits of said 6-bit address defining a position of said sub-array in said memory array; and said write address decoder comprises:
- a write wordline decoder adapted to generate an 8-bit address of said first set of 3-bits and a 1-bit to the left shifted 8-bit address of said 8-bit address;
- seven 2:1 address multiplexers, an output of each address multiplexer coupled to a corresponding wordline select of seven sequential memory sub-arrays beginning with said first memory sub-array, a first input of each address multiplexer coupled to said 8-bit address, a second input of each address multiplexer coupled to said shifted 8-bit address and the select input of each address multiplexer coupled to a logic circuit, said logic circuit coupled to said second set of 3-bits; and
- said 8-bit address coupled to a wordline select of said last memory sub-array.

20. The method of claim 18, wherein:
a number of said physical entry positions in each said memory sub-array is equal to Q;
a maximum number of instructions in said set of concurrent instructions to be read out of said memory array concurrently is equal to M;
N is equal to 8 and Q is equal to 8;
the first instruction in said set of concurrent instructions has a physical instruction entry position defined by a 6-bit address, a first set of 3-bits of said 6-bit address defining a physical entry position in each memory sub-array and a second set of 3-bits of said 6-bit address defining a position of said sub-array in said memory array; and
said read address decoder comprises:
- a read wordline decoder adapted to generate an 8-bit address of said first set of 3-bits and a 1-bit to the left shifted 8-bit address of said 8-bit address;
- (M−1) 2:1 address multiplexers, an output of each address multiplexer coupled to a corresponding wordline select of (M−1) consecutive memory sub-arrays starting with said first memory sub-array, a first input of each address multiplexer coupled to said 8-bit address, a second input of each address multiplexer coupled to said shifted 8-bit address and the select input of each address multiplexer coupled to one bit of said second set of 3-bits; and
- said 8-bit address coupled to a wordline select of the each memory sub-arrays not coupled to an output of one of said (M−1) 2:1 multiplexers.

21. The method of claim 20, wherein M is equal to 5.

22. The method of claim 13, wherein:
a maximum number of instructions to be read out of said memory array concurrently is M instructions; and
said output multiplexer comprises M, N:1 multiplexers.

23. The method of claim 13, wherein:
a maximum number of instructions in said set of concurrent instructions is equal to N instructions;
a number of said memory sub-arrays in said memory array is N;
a number of said physical entry positions in each said memory sub-array is equal to Q; and
Q may or may not be equal to N.

24. The method of claim 13, wherein each memory sub-array is selected from the group consisting of static random access memory arrays, dynamic random access memory arrays, latch arrays, or a register array.

* * * * *